Dec. 19, 1967      GENTARO NIINA ETAL      3,358,436
PROCESS FOR SPREADING OR DIVIDING TEXTILE MATERIALS
Filed Oct. 19, 1964                         2 Sheets-Sheet 1

GENTARO NIINA,
YOSHIYUKI SASAKI, AND
MASAYUKI TAKAHASHI
INVENTORS

BY Wenderoth, Lind
3rd Ponack
ATTORNEYS

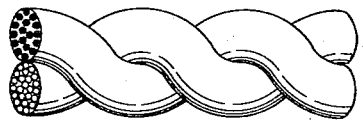 
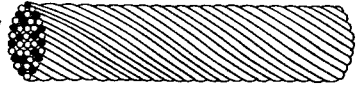 
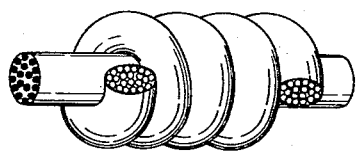 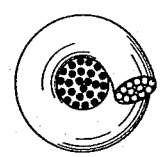
 
 
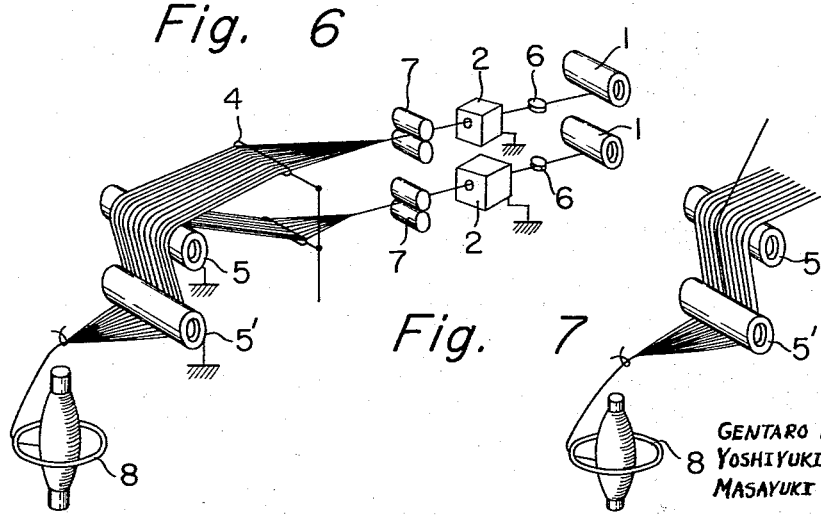
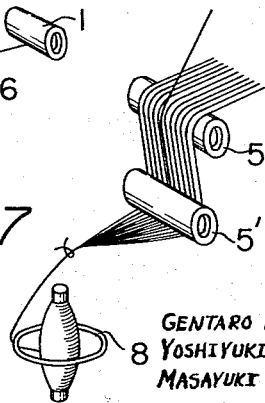

United States Patent Office 3,358,436
Patented Dec. 19, 1967

3,358,436
PROCESS FOR SPREADING OR DIVIDING
TEXTILE MATERIALS
Gentaro Niina, Yoshiyuki Sasaki, and Masayuki Takahashi, Iwakuni-shi, Yamaguchi-ken, Japan, assignors to Teijin Limited, Osaka, Japan
Filed Oct. 19, 1964, Ser. No. 404,602
Claims priority, application Japan, Nov. 5, 1963, 39/17,789
9 Claims. (Cl. 57—162)

ABSTRACT OF THE DISCLOSURE

A substantially non-twisted strand of continuous textile filaments is spread electrically into individual filaments by imparting electrical conductivity to the filaments, for example by spraying water thereon, and then introducing a high electric potential of at least 5000 volts to the wet filaments. The water applied to the filaments may contain surface active agents and/or electrolytes. The process affords extremely stable operability and high productivity, and is applicable for example to the production of intimately blended continuous filament yarn from two or more different multifilament yarns.

---

The present invention relates to a process for spreading or dividing one-dimensional, textile materials consisting of a number of continuous filaments such as yarns, strands, tows and the like into individual filaments. The previous method for spreading or dividing continuous multifilament yarns into individual monofilaments or a plurality thereof was generally carried out by electrically charging said continuous multifilaments by friction and utilizing repulsive power generated between monofilaments. However, this method had the disadvantage that only hydrophobic fibers which were easy to charge by friction could be handled by said method, and that even when fibers of good chargeability were used, amounts of charge were extremely unstable depending on the moisture content of fibers, oily agents attached thereto and humidity conditions, thus providing a low effect in spreading or dividing filaments.

In addition to the above method, there was another which utilized radiations in charging. This method was also defective in that amounts of charge widely fluctuated depending on the moisture content of fibers charged, oily agents attached thereto and conditions of atmospheric humidity, thus requiring radiations of considerably high intensity.

One of the primary objects of the present invention is to eliminate the aforementioned difficulties encountered in the previous methods and provide a new process for spreading or dividing one-dimensional textile materials consisting of continuous multifilaments such as yarn, strands, tows and the like into individual monofilaments. Another object of the present invention is to provide a spreading process which has a high dividing effect, uniformly spreads yarns into monofilaments equally spaced from each other and, moreover, is capable of stable operation. A specific object of the present invention is to provide a process for effectively spreading even those filamentary textile materials (for example, rayon) to which the previous charge dividing method could not be applied. Further objects and advantages of the present invention will be clear from the following description.

The aforesaid objects and advantages can be achieved by the process of the present invention which comprises imparting electric conductivity to one-dimensional textile materials consisting of continuous multifilaments, applying to them a high voltage current to an extent of at least 5000 volts, thereby spreading said materials into individual monofilaments.

Figure 1:
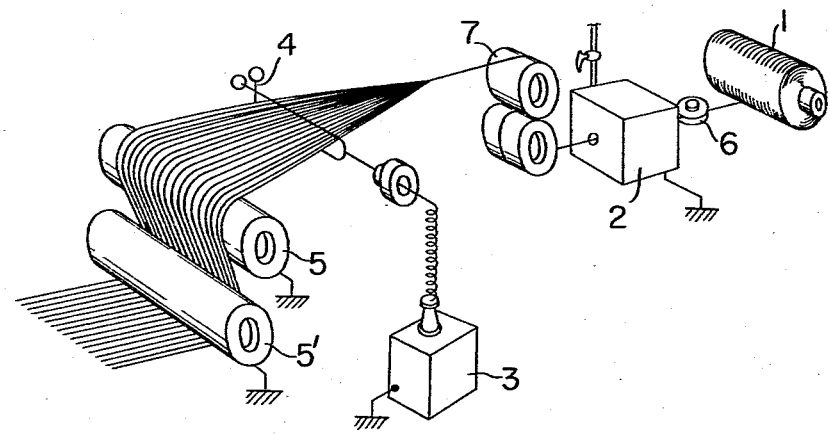
Figure 2:
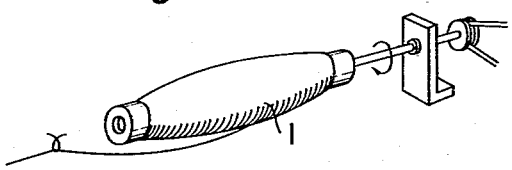
Figure 4A:
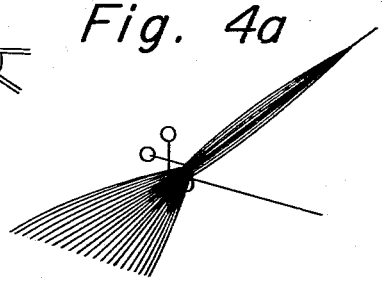
Figure 3:
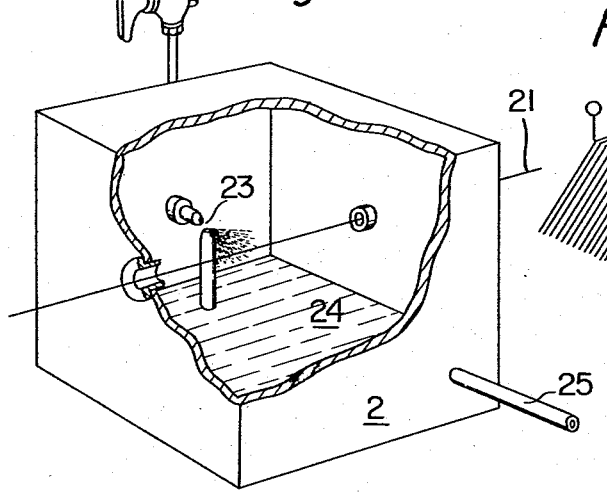
Figure 4B:
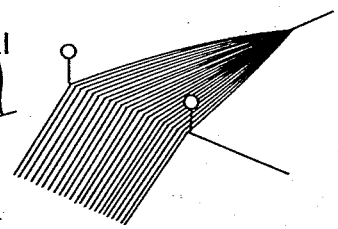

Illustrative embodiments of the invention will now be described with reference to the accompanying drawings, in which:

FIGURE 1 is a schematic diagram of an apparatus for carrying out the spreading process of the invention;
FIGURE 2 is a perspective view of a device for untwisting twisted filaments;
FIGURE 3 is an enlarged cutaway view of a device for imparting electric conductivity to the filaments;
FIGURES 4a and 4b are perspective views of alternative forms of electrodes used in the separating or dividing of the filaments;
FIGURES 5a1 to 5e2 are respective perspective and sectional views of different configurations of blended yarns;
FIGURE 6 is a schematic diagram of an apparatus for carrying out the process of the invention when used to blend filaments; and
FIGURE 7 is a schematic diagram of an apparatus for carrying out the process of the invention when used to produce covered yarns.

In this specification, one-dimensional textile materials consisting of a number of continuous filaments may be referred to as "multifilamentary textile materials" or "continuous multifilaments."

As seen in FIG. 1, continuous multifilaments are introduced from bobbin 1 through compensator 6 controlling filament tension into means 2 for imparting electric conductivity to said filaments. Then continuous multifilaments are subjected to the process of the present invention in a non-twisted form or a state approximating it (namely, a state comprising not more than about 5 twists per meter). The feed device for continuous multifilaments should be of such type which provides no more than 5 twists of said filaments per meter. In other words, in the present invention, a means for directly feeding filaments can be used when they are not substantially twisted. Also in case filaments are twisted, a device (such as shown in FIG. 2) is employed to feed said filaments while untwisting them.

The continuous multifilaments leaving bobbin 1 are given electric conductivity in means 2. Electric conductivity may be imparted by spraying filaments to be treated with water or aqueous solutions of surface active agents (for example, anionics such as high alcohol sulfuric ester salts, aliphatic amine salts and alkyl phosphoric esters, cationics such as the quaternary ammonium and pyridium salts, amphoterics such as high aliphatic amino alcohol sulfuric ester and phosphoric ester and nonionics such as polyoxyethylene alkyl ether and polyoxyethylene polyoxypropylene alkyl ether) and aqueous solutions of inorganic electrolytes (for example, LiCl, NaSO₄ and MgCl) or by immersing said multifilaments in these electric conductivity agents or by padding the multifilaments with said agents. Continuous multifilaments may undergo treatments for electric conductivity before being taken up by bobbin 1. When the continuous multifilaments already contain large amounts of anti-static agents (surface active agents) it will be sufficient to expose said filaments to atmospheres of high humidity. The extent to which electric conductivity should be imparted depends on the kind, denier and tension of the filaments to be treated and the degree of required spreading. However, it is desirable in most cases to impart electric conductivity in such a manner that when measured at 30,000 v., the filament resistance is not higher than $5 \times 10^{11}$ Ω/cm./d., preferably within the range between $5 \times 10^{11}$ and $2 \times 10^{6}$ Ω/cm./d. With filaments having a higher resistance than $5 \times 10^{11}$ Ω/cm./d., it is impossible to obtain a desirable spreading effect. Again with filaments having a lower resistance than $2 \times 10^6$ Ω/cm./d., filaments are likely to be damaged, although spreading may be accomplished to a desired extent. FIG. 3 shows details of means 2 for imparting electric conductivity by spraying. Compressed air is jetted from nozzle 23 through duct 22. At this time the jetted air blows electric conductivity agents 24 on to filaments 21 in their atomized form. The electric conductivity agents 24 are introduced through line 25, so that their level can be kept constant. The amounts of agents imparting electric conductivity to the filaments to be treated can be controlled by adjusting the pressure of air supplied through line 22, as long as the shape of nozzle 23, the distance between nozzle 23 and filaments 21 and the level of electric conductivity agents 24 charged remain unchanged. This air pressure is referred to as spraying pressure. The term may sometimes be used to express the amounts of electric conductivity agents applied on a relative basis.

The continuous multifilaments to which electric conductivity has been imparted are conducted through feed rolls 7, depending on circumstances, to electrode 4 coupled to a high voltage power source 3. For the process of the present invention, any high voltage power source may be used, if it supplies filaments with at least 5000 volts of electric current. The current may be alternating, but preferably is direct. Although the upper limit for the voltage applied is not critical, a voltage up to about 100,000 v. is suitable from the practical standpoint of insulation techniques. Suitable electrodes for use in the process of the present invention are such types as shown in FIGS. 4*a* and 4*b* in addition to that shown in FIG. 1.

The continuous multifilaments through which electric current has thus been introduced are divided due to repulsive power between individual monofilaments and are spread over spread rolls 5 which are substantially grounded. The potential of electrode 4 may be positive or negative. When the potential of electrode 4 is positive the electric current flows through the filaments and spread rolls, starting with electrode 4, and runs also from electrode 4 through the filaments and means 2 for imparting electric conductivity.

According to the process of the present invention, it is possible to carry out spreading as required, regardless of the kind of filaments to be treated. With the previous charge spreading method, it was practically impossible to conduct the spreading of hydrophilic filaments such as rayon. However, with the process of the present invention, the spreading of even rayon can be carried out effectively. Furthermore, the process of the present invention is not relatively sensitive to the moisture content of the filaments to be treated, amounts of oily agents attached thereto and the degree of humidity in which the operation is performed, and therefore is capable of stable operation. The extent of spreading can also be varied over a wide range by controlling the voltage used.

The spreading process of the present invention is applicable in the broad field of the fiber manufacturing industry. For example, said spreading process can be utilized in the manufacture of blended continuous filament yarns consisting of more than two different continuous monofilaments which have been divided and then mixed well.

Hitherto, a large number of chemical fibers and synthetic fibers have been developed and used in combination with natural fibers in many different fields in accordance with their respective properties. However, these properties did not always meet the requirements of those fields in which they were applied. Therefore to meet said requirements, composite properties were imparted to yarns or fabrics by mixing these fibrous strands or by means of mixed weaving or spinning.

For a uniform composition of different kinds of staple fibers, it is possible to blend more than two different monostaples and spin said blended staple fibers into yarns. However, such a process is not practicable in the composition of different kinds of continuous filaments. Mixed stranding may be used as a means for composing different kinds of filaments into yarns. However, according to this stranding process, mixed strand yarns consist of separate strands of more than two different kinds of multifilament yarns. In other words, they represent nothing but aggregates of individual different kinds of said filaments. (FIG. 5*a*.) Consequently these yarns have such properties as described below. Although they have strong points in their way, yet they also have shortcomings in another sense. (1) The yarns consisting of filaments thus stranded become grandville yarns depending on differences in the dyeability and luster of individual component yarns, but are incapable of producing sprinkled color effects. (2) To illustrate the properties of the yarns under review, their apparent overall life is restricted almost solely by the life of one of the component filaments which has relatively lower quality, and interfilament compensation is not satisfactorily attained. Consequently the features of higher quality filaments are difficult to display. (3) The relative positions of individual component filaments are maintained only by twisting and are easily affected by the number of twists used and also readily get out of shape. (4) It is difficult to obtain varieties embodying the composite properties of individual component filaments, for example, bulky yarns in which the different contraction rates of the component filaments are utilized.

The foregoing shortcomings can be eliminated by attaining such a blended state as in blended spun yarns. The desired blended continuous filament yarns can be manufactured by a process according to the present invention, for example, as illustrated in FIG. 6, by spreading different kinds of continuous multifilaments separately and placing types (A) and (B) of said filaments thus spread one on top of the other in such a manner that they can be blended most easily and taking up the mixture by draw twister 8. The blended continuous filament yarns obtained are shown in FIG. 5*b* and are in striking contrast to the mixed strand yarns in FIG. 5*a*.

Also for various purposes, for instance, to restrict extensibility, facilitate handling or improve touch, the so-called core yarns have been developed which consist of filament yarns provided with a covering. According to the previous method, said core yarns are prepared by winding covering yarns directly around the core yarn, with the resultant trouble that the wrap is too thick. (FIG. 5*c*.) Obviously, when extremely fine covering yarns are used in this case, thin layers of wrapping are obtained. However, this makes covering yarns quite expensive and operation difficult from the standpoint of strength. Moreover, since the processing speed substantially drops, the operation is extremely inefficient and impractical. However, as previously described, the process of the present invention enables multifilaments to be divided into individual monofilaments. Therefore, if said multifilaments are used as a covering in a spread state as shown in FIG. 7 even the use of thick covering material can produce substantially the same effect as if fine covering material was used. The covering yarns thus obtained are shown in FIG. 5*e*.

The process of the present invention is also applicable in the processing of crimped yarns. In the previous known methods of crimping including stuffing and false twisting filamentary crimped yarns consisting of two different filaments were obtained either by jointly twisting said two yarns which had been separately crimped in advance or by crimping said two yarns after they had been jointly twisted. In either case the trouble was that no crimped yarns could be obtained which consisted of two different yarns whose monofilaments were completely blended, and that two layers of spotty patterns were observed. According to the process of the present invention, however, yarns consisting of two different yarns whose monofilaments are completely blended can be crimped. Consequently crimped yarns thus obtained present no spotty phases. Again in the edge crimping method, one of the crimping processes, filaments which were positioned in the central part of the multifilament did not come in contact with the blade edge, so that fully crimped yarns were not obtained. For this reason only monofilaments were usually used in the edge crimping method. However, according to the process of the present invention individual monofilaments are separated from each other as illustrated in FIGS. 1 and 6 and can be brought in contact with the edge, thus enabling multifilaments to be fully crimped.

The process of the present invention will be more clearly understod with reference to the examples which follow. However, it should be noted that the present invention is not limited to those examples.

EXAMPLE 1

Non-twisted polyethylene terephthalate yarns consisting of 75 d.–36 filaments were spread on spread rolls 5 providing a maximum spread width of 15 cm., using the same equipment as shown in FIG. 1 excepting that electrode 4 illustrated in FIG. 4a was used. In this case the feed speed for treatment of filaments was 300 m./min. and the feed tension was 0.1 g./d. Electric conductivity was imparted by spraying water, using a means shown in FIG. 3. Table 1 below shows the spread widths (cm.) obtained on spread rolls 5 at indicated spray pressures (kg./cm.$^2$), filament resistances obtained by spraying ($\Omega$/cm./d. as measured at 30,000 volts) and indicated D.C. power (v.).

EXAMPLE 2

Nylon 6 yarns consisting of 110 d.–30 filaments were spread in the same manner as was used in Example 1. Table 2 below shows the spread widths (cm.) obtained on spread rolls 5 at indicated spray pressures (kg./cm.$^2$), filament resistances ($\Omega$/cm./d. as measured at 30,000 v.) and indicated D.C. power (v.).

TABLE 2

| Voltage v. | Spray pressure (Resistance) | | | | | |
| --- | --- | --- | --- | --- | --- | --- |
| | 0.00 (5×10$^{16}$) | 0.10 | 0.15 (1.1×10$^{11}$) | 0.20 (7.8×10$^{10}$) | 0.25 (6.1×10$^{10}$) | 0.30 (3.7×10$^{10}$) |
| 20,000 | 0 | 0 | 1 | 8 | 4 | 2 |
| 25,000 | 0 | 0 | 7 | 14 | 15 | 15 |
| 30,000 | 0 | 0 | 10 | 11 | 15 | 15 |
| 35,000 | 0 | 0 | 1 | 8 | 13 | 15 |
| 40,000 | 0 | 0 | 0 | 18 | 15 | 15 |

Next the filaments which had been spread at a spray pressure of 0.20 kg./cm.$^2$ and D.C. power of 25,000 were wound up in contact with the edge while heated to 120° C., at a feed speed of 100 m./min., and initial tension of 2 g./d., with the contact angle between the edge and the filiments set at 7°. The filaments thus obtained were crimped very uniformly and effectively. The capacity of said filaments to be crimped was more than twice that of non-divided filaments.

EXAMPLE 3

Rayon yarns of 120 d.–75 filaments were spread in the same manner as was followed in Example 1. Table 3 presents the spread widths (cm.) obtained on spread rolls 5 at indicated spray pressures (kg./cm.$^2$), filament resistances ($\Omega$/cm./d. as measured at 30,000 v.) and indicated D.C. power (v.).

TABLE 3

| Voltage v. | Spray pressure (Resistance) | | | | | |
| --- | --- | --- | --- | --- | --- | --- |
| | 0.00 (8×10$^{14}$) | 0.10 | 0.15 (1.2×10$^{11}$) | 0.20 (6.0×10$^{10}$) | 0.25 (7.1×10$^{9}$) | 0.30 (2.3×10$^{9}$) |
| 20,000 | 0 | 0 | 1 | 0 | 0 | 0 |
| 25,000 | 0 | 0 | 2 | 5 | 10 | 0 |
| 30,000 | 0 | 0 | 2 | 8 | 15 | 15 |
| 35,000 | 0 | 0 | 3 | 10 | 15 | 15 |
| 40,000 | 0 | 0 | 3 | 10 | 15 | 15 |

TABLE 1

| Voltage v. | Spray pressure (Resistance) | | | | | |
| --- | --- | --- | --- | --- | --- | --- |
| | 0.00 (3×10$^{16}$) | 0.10 | 0.15 (1.6×10$^{11}$) | 0.20 (2.7×10$^{10}$) | 0.25 (2.0×10$^{10}$) | 0.30 (1.8×10$^{10}$) |
| | Cm. | Cm. | Cm. | Cm. | Cm. | Cm. |
| 10,000 | 0 | 0 | 5 | 0 | 0 | 0 |
| 15,000 | 0 | 0 | 6 | 14 | 3 | 0 |
| 20,000 | 0 | 0 | 5 | 14 | 15 | 13 |
| 25,000 | 0 | 0 | 5 | 14 | 15 | 15 |
| 30,000 | 0 | 0 | 4 | 13 | 15 | 15 |
| 35,000 | 0 | 0 | 6 | 12 | 15 | 15 |
| 40,000 | 0 | 0 | 5 | 13 | 15 | 15 |

Next the filaments which had been spread at a spray pressure of 0.25 kg./cm.$^2$ and D.C. power of 20,000 v. were grouped into sets each consisting of four filaments. They were further subdivided and taken up on a winder. Sub-division according to this example enabled much higher productivity and stability than that which was possible with the previous method based on friction charge.

Next the filaments which had been spread at a spray pressure of 0.25 kg./cm.$^2$ and D.C. power of 35,000 v. were wound up on a draw twister with the process shown in FIG. 7, while being covered with polyethylene terephthalate yarns of 30 d.–12 filaments by inserting them between spread rolls 5.

The textile thus obtained by the use of said covering yarns was uniformly colored without sprinkled patterns when dyed with rayon dyestuff, and its tensile strength and crease recovery was superior to the same textiles of rayon only.

EXAMPLE 4

With an apparatus illustrated in FIG. 6, non-twisted polyethylene terephthalate yarns of 75 d.–36 filaments and non-twisted rayon yarns of 75 d.–34 filaments were separately spread with D.C. power of 35,000 v. Both yarns were placed one on the other on spread rolls 5 with their widths adjusted to the same extent and then wound up while being twisted. In this case a means 2 in the part handling the polyethylene terephthalate yarns was arranged so as to apply a 2% aqueous solution of dodecyl alcohol sulfuric ester sodium salt to the filaments through a spongy medium. The electric resistance of said filaments was set at $2.5 \times 10^{10}$ $\Omega$/cm./d. as measured at 30,000 v. On the other hand, a water-spraying apparatus was used in the part handling rayon yarns. The electric resistance of said filaments was controlled to $6 \times 10^7$ $\Omega$/cm./d. as measured at 30,000 v. The width of the electrode 4 was set at 12 cm. Then treatment was conducted at a feed rate of 400 m./min. and a feed tension of 0.1 g./d. for both filaments.

The textile fabricated from yarns thus obtained which consisted of blended monofilaments presented no moire phenomenon which had been observed in the traditional mixed strand fabric and had better surface endurance.

EXAMPLE 5

With an apparatus shown in FIG. 6 except for bobbin 1 and electric conductivity means 2, acetate yarns of 50 d.–14 filaments and 20 twist/m. and nylon 66 yarns of 100 d.–48 filaments and 20 twist/m. were respectively spread and then blended at a feed rate of 300 m./min. and a feed tension of 0.5 g./d. with 20,000 v. pulsating current introduced through electrode 4 at 60 c./s. Bobbins 1 used then respectively consisted of such apparatus as illustrated in FIG. 2, so that the yarns could be untwisted nearly completely. The acetate filaments were treated with saturated steam so that they could be given electric conductivity with their resistance averaging $5 \times 10^9$ $\Omega$/cm./d. as measured at 30,000 v. The nylon 66 filaments were also given electric conductivity by being dipped in a bath containing a 0.5% aqueous solution of polyoxyethylene nonylphenol ether $(EO)_{10}$ with their resistance averaging $3 \times 10^{11}$ $\Omega$/cm./d. as measured at 30,000 v.

Next the filaments which had been blended in a spread state were introduced into a twist apparatus shown in the United States Patent No. 2,803,109 to obtain crimped yarns. Said yarns had no portions where different types of filaments were separated due to varying degrees of crimping between them. Thus the blended yarns showed nearly the same uniform appearance as that observed in the crimped yarns consisting of the same kinds of filaments.

EXAMPLE 6

With the same appartus as shown in FIG. 6 except for electric conductivity means 2, non-twisted nylon 6 yarns of 1680 d.–272 filaments and non-twisted acetate yarns of 1200 d.–120 filaments were spread on spread rolls 5 allowing a maximum spread width of 20 cm. at a feed rate of 100 m./min. and a feed tension of 0.5 g./d. and thereafter blended by being placed one on the other. The D.C. power used had a voltage of 100,000 v.

The electric conductivity means 2 consisted for the nylon 6 yarns of a bath provided with pad rolls which contained a 0.8% aqueous solution of polyoxyethylene octyl ether $(EO)_{15}$ and for the acetate yarns of a bath in which to dip said yarns in an aqueous solution of 0.5% of $Na_2SO_3$ and LiCl.

Next the filaments which had been blended in a spread form were introduced into an apparatus as illustrated in the United States Patent No. 2,854,728 (Japanese patent publication: No. Sho 27–4048) before being wound up to obtain crimped yarns. An economical carpet having a soft handling was manufactured from said crimped yarns.

EXAMPLE 7

With an apparatus shown in FIG. 1, non-twisted polyvinyl chloride yarns of 120 d.–24 filaments which had only been elongated and not heat treated after spinning were spread at a feed rate of 200 m./min. The filaments thus spread were given electric conductivity by spraying water with a means shown in FIG. 3 to such extent that they had a resistance of $3 \times 10^{11}$ $\Omega$/cm./d. The D.C. power introduced into electrode 5 had a voltage of 5000 v.

Next the yarns still remaining in a spread state were partially heat treated with a high frequency heater before they were wound up. The monofilaments of said yarns were heat treated under exactly the same conditions. Consequently when the yarns were woven into fabric, followed by finishing, a soft bulky fabric of high uniformity was obtained.

Having described the specifications, we claim:

1. Process for spreading one-dimensional solid textile materials each consisting of a number of continuous filaments, which comprises imparting electric conductivity to said material by applying an electrically conductive liquid thereto, and then applying thereto an electric current of at least 5000 volts, thereby spreading the materials into individual filaments.

2. Process as claimed in claim 1 in which said one-dimensional textile materials are yarns or tows.

3. Process as claimed in claim 1 which is characterized by imparting electric conductivity to said one-dimensional textile materials to the extent that their resistance is not higher than $5 \times 10^{11}$ $\Omega$/cm./d. as measured at 30,000 volts.

4. Process as claimed in claim 1 in which electric current is applied to said one-dimensional materials when they are in their substantially non-twisted state.

5. Process for spreading one-dimensional solid textile materials consisting of a number of continuous filaments which are substantially untwisted comprising applying an electrically conductive liquid thereto to impart to said textile materials electric conductivity to the extent that their resistance ranges between $2 \times 10^6$ to $5 \times 10^{11}$ $\Omega$/cm./d. as measured at 30,000 volts and thereafter spreading and dividing said materials into individual filaments by applying thereto an electric current of 5000 to 100,000 volts.

6. Process for preparing intimately blended continuous solid filament yarns from at least two different multi-filament yarns, which comprises applying electrically conductive liquid to the solid filaments of each of the two different yarns for imparting electric conductivity to each of said two different solid multi-filament yarns applying an electric current of at least 5000 volts to each of said yarns in their substantially non-twisted state to spread each of said yarns into individual filaments and thereafter winding up said two yarns together into a single yarn in which all said individual monofilaments are intimately blended.

7. Process as claimed in claim 6 in which the step of imparting electric conductivity to said different multifilament yarns comprises making their respective resistances no higher than $5 \times 10^{11}$ $\Omega$/cm./d. as measured at 30,000 volts.

8. Process as claimed in claim 6 in which the step of imparting electric conductivity to each of said multifilament yarns comprises making their respective resistance in a range from $2 \times 10^6$ to $5 \times 10^{11}$ $\Omega$/cm./d. as measured at 30,000 volts, and the step of applying an electric current comprises applying from 5000 to 100,000 volts to each of said yarns in their substantially non-twisted form.

9. A process for preparing a textile yarn in which a core yarn is covered with a plurality of filaments, comprising spreading a multifilament yarn having a plurality of solid filaments into individual spaced filaments by applying to the filaments an electrically conducting liquid and then applying thereto an electric current of at least 5000 volts, feeding a textile core yarn onto said spread multifilament yarn, and twisting the thus superposed yarns into a single covered yarn.

References Cited

UNITED STATES PATENTS

| | | | |
|---|---|---|---|
| 2,158,415 | 5/1939 | Formhals | 28—1 |
| 2,825,199 | 3/1958 | Hicks | 57—36 |
| 2,953,893 | 9/1960 | Smith et al. | 57—157 X |
| 3,046,632 | 7/1962 | Tsutsumi | 28—1 |
| 3,070,950 | 1/1963 | Thomas | 57—157 |
| 3,268,971 | 8/1966 | Lockwood | 28—1 |

FRANK J. COHEN, *Primary Examiner.*

JOHN PETRAKES, *Examiner.*